March 4, 1969   J. L. BROWN ET AL   3,431,425
SYSTEM FOR PHOTOELECTRIC CONTROL OF MOVING WEBS
Filed March 1, 1965   Sheet 1 of 5

INVENTORS
JERALD L. BROWN &
JOHN J. SHELTON
BY
Dunlap & Laney
ATTORNEYS

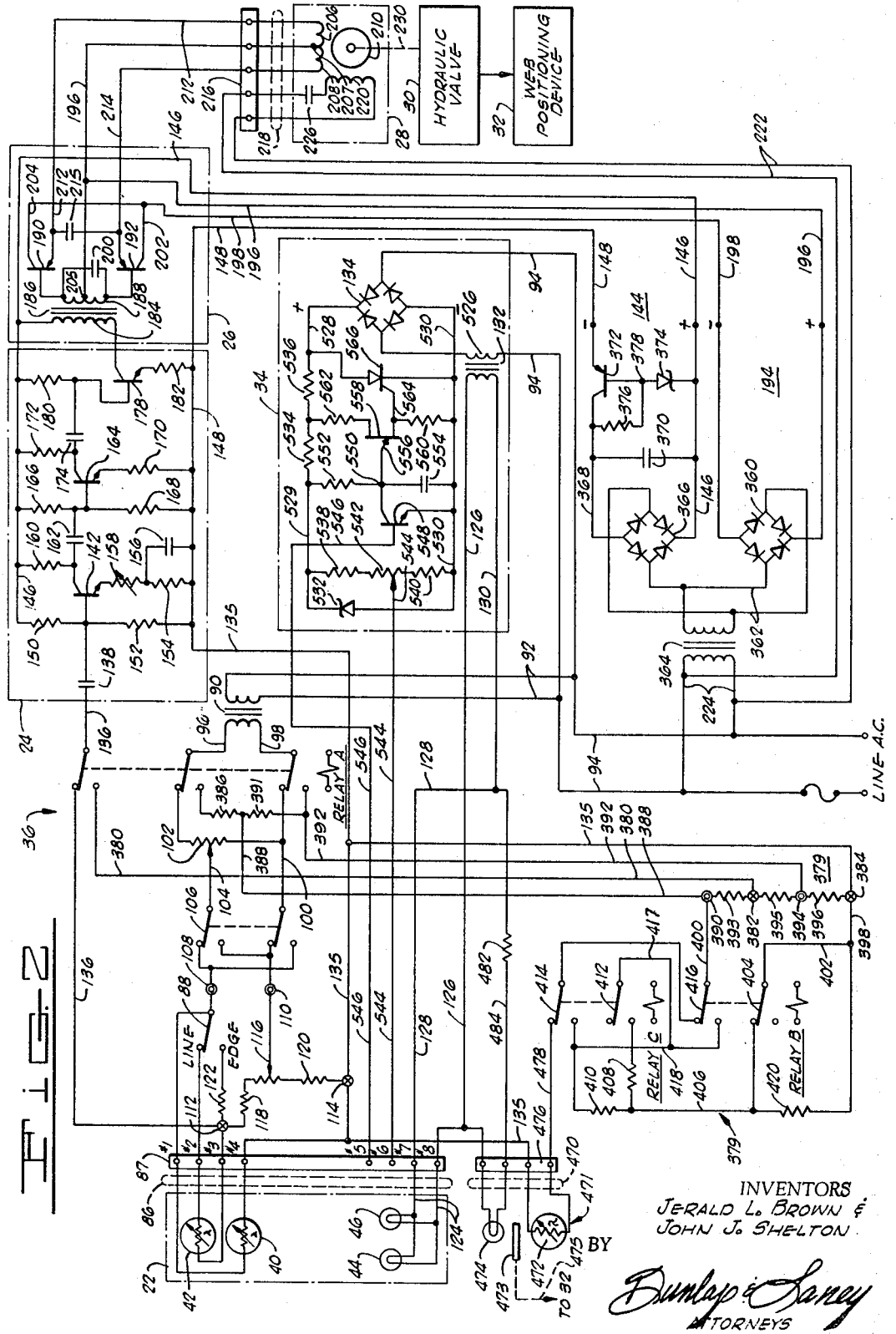

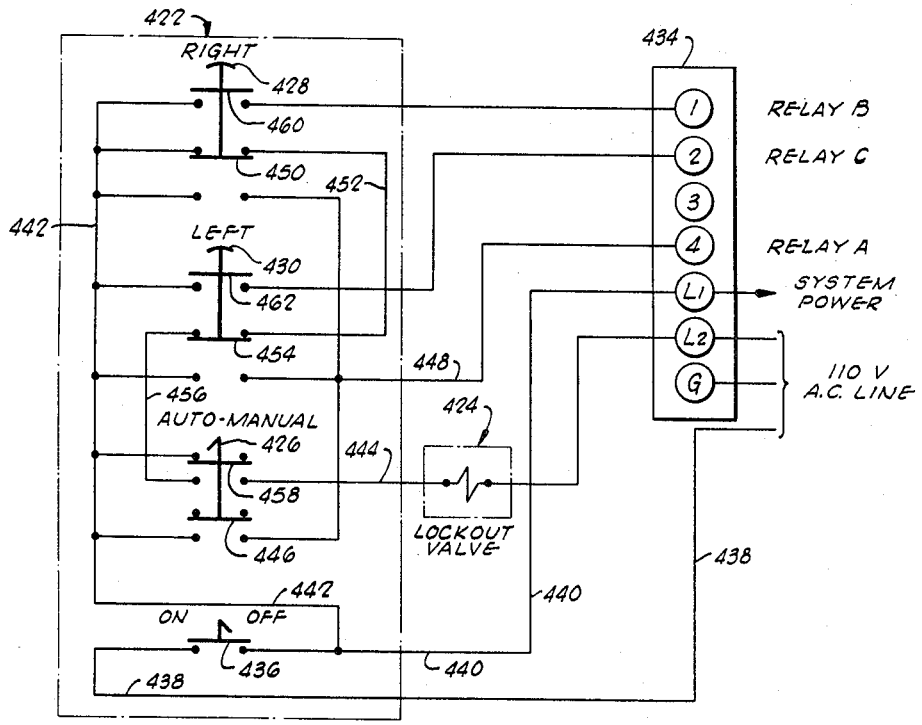
FIG. 9
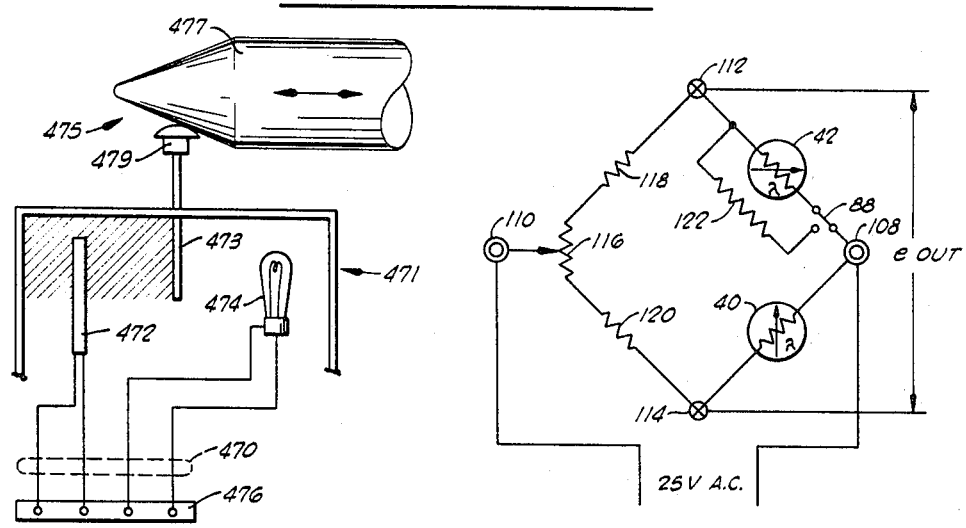
FIG. 10
FIG. 6
INVENTORS
JERALD L. BROWN &
JOHN J. SHELTON
BY
Dunlap & Laney
ATTORNEYS INVENTORS
JERALD L. BROWN &
JOHN J. SHELTON
BY
Dunlap & Laney
ATTORNEYS

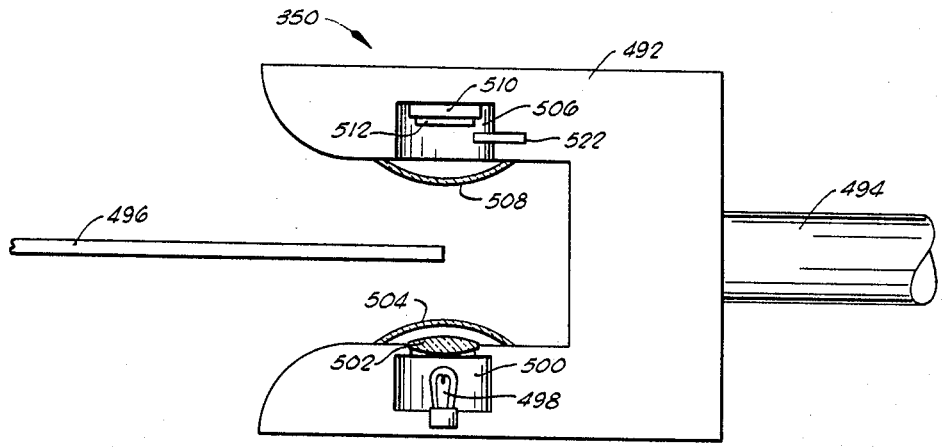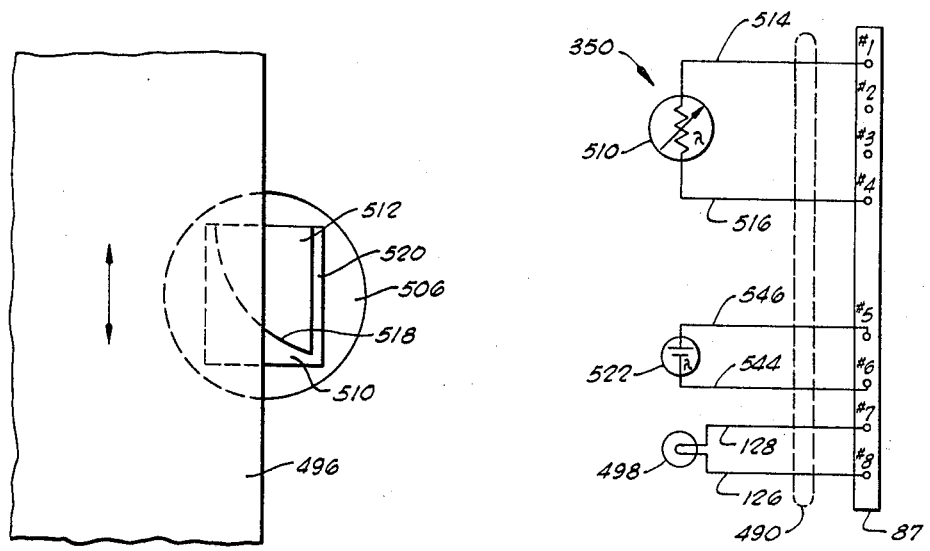

United States Patent Office 3,431,425
Patented Mar. 4, 1969

3,431,425
SYSTEM FOR PHOTOELECTRIC CONTROL
OF MOVING WEBS
Jerald L. Brown, Midwest City, and John J. Shelton, Stillwater, Okla., assignors to Fife Manufacturing Company, Oklahoma City, Okla., a corporation of Oklahoma
Filed Mar. 1, 1965, Ser. No. 436,232
U.S. Cl. 250—219
Int. Cl. G01n 21/30
15 Claims

ABSTRACT OF THE DISCLOSURE

Apparatus for enabling positioning surveillance of the edge or specified indicator of a moving web, the apparatus consisting of a sensing head for continually deriving a position indication from said edge or indicator line and control circuitry energized in response to said continual position indication to effect correcting realignment of the web. The control circuitry consists of means for amplifying the position indication to develop an error signal for controlling a two-phase servo motor which effects energization of a hydraulic valve-controlled web positioning mechanism to realign the traveling web.

This invention relates generally, as indicated, to controlling moving webs; and more particularly, but not by way of limitation, to improved photoelectric equipment for enabling continual positioning of a moving web in proper alignment.

The prior art will reveal many and various types of web-guiding equipment which utilize photoelectric as well as other types of control. This has constituted a broad field of activity and many types of electronic, pneumatic, hydraulic, etc. equipment have been employed in the web-guiding function. Each of the prior types has had its individual advantages and disadvantages and the present invention provides an improved system offering still greater advantage to diverse applications.

It has been found that prior systems were, generally speaking, too restrictive as to their usages. That is, web-guiding devices suitable for one operation with a particular web material and speed of travel might not perform well under slightly changed conditions of operation. Also, the prior units were generally cumbersome and not intended for varied application. The electrical system as disclosed herein enables a much greater length of control lines (electrical leads), as opposed to pneumatic lines, for example, and the control and sensing devices are easily movable for setup at any desired location.

Further improvement over prior art devices is gained through using an A-C control signal and A-C operators at all points in the electrical system, thereby completely avoiding the problems of drift which are inherent in analogous D-C devices. The use of A-C throughout the system is enabled through employing a servo-motor as an A-C actuator for controlling a servo valve or other web-positioning means, as opposed to the use of such D-C devices as torque motors and moving coils.

The present invention contemplates a photoelectrically controlled web-guiding system which can be made to respond to tracking of either the web edge or a guide line or other reasonably reliable indicator appearing on the web, to actuate web-guiding equipment so that it may exercise continual positioning to maintain web alignment. In a more limited aspect, the present invention provides alternative embodiments of photoelectrically actuated bridge circuits which produce an A-C voltage having an amplitude which is indicative of the degree of web mis-alignment and having a phase which indicates the direction of mis-alignment. This A-C voltage is then amplified and applied to drive a servo-motor, such that the servo-motor can control the actuation of a hydraulic valve to position web-guiding equipment. The invention further contemplates novel alternatives of system operation which enable complete operator control in diverse modes or applications throughout all phases of the web-guiding operation.

The present invention further contemplates novel photo-electric sensing heads for tracking a moving web. In one type of head, two photo cells are used to accurately track deviations in the path of movement of a line on a moving web by providing reversed sensitivities in the photo cells. In another type of head, a single photoresponsive element is employed to provide a web mis-alignment signal in response to transmitted light traveling through the web or past its edge.

The present invention also contemplates a novel valve actuator for a web-guiding system which is particularly useful when photoelectric sensing is used. This actuator utilizes an A-C low inertia induction motor as a torque motor responsive to push-pull type inputs for positioning a hydraulic control valve.

It is an object of the present invention to provide web-guiding equipment which is versatile as to many possible modes of operation.

It is another object of the invention to provide a web-guiding system which can function from either transmitted light or reflected light sensing operations.

It is a further object of this invention to provide alternative photoelectric web-sensing equipment, for either reflected or transmitted light, which offers improved, more accurate and more reliable performance of its intended function.

It is a still further object of the invention to provide versatile web-guiding equipment which is compact and easily portable in and near the area of operation.

It is yet another object of the present invention to enable web-positioning control which is characterized by faster response, control of overshoot, and constant, accurate tracking.

It is still another object of this invention to provide compact web alignment control equipment which is operable in varied ways and modes of operation to control diverse types of web material of the opaque, translucent or transparent type.

Finally, it is an object of the present invention to provide photoelectric web-guiding equipment which may be operated in either line or edge guiding modes and which can enable manual or automatic positioning of diverse types of web materials carrying various indicators or markings.

Other objects and advantages of the invention will be evident from the following detailed description when read in conjunction with the accompanying drawings which illustrate the invention.

In the drawings:

FIG. 2 is a schematic diagram of the main amplifier chassis with additional sections of the system shown in block form.

FIG. 6 is a schematic diagram of the main resistance bridge of FIG. 2.

FIG. 9 is a schematic diagram of an exemplary switch station which may be used for system control.

FIG. 10 is a diagram of one form of servo center actuator used in the system.

FIG. 11 is a schematic diagram of the transmitted-light sensing head which is used in a second embodiment of the invention.

FIG. 12 is a side view of the transmitted-light sensing head.

FIG. 13 is a view along the optical viewing axis of the transmitted-light sensing head.

*Detailed description of one embodiment*

Figure 1:
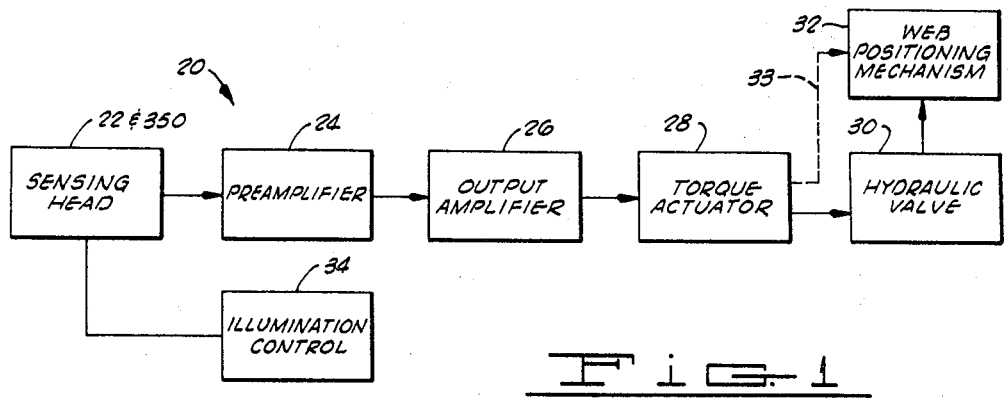
FIG. 1 is a block diagram of the basic web-guiding system.

The web-guiding system, indicated by general reference as 20, is shown in block diagram form in FIG. 1. A sensing head 22, of photoelectric type using reflected-light, is placed in operative sensing relationship to the moving web which it is desired to control. This sensing position might be an alignment which effects tracking of the web edge or, it may track a line or other indication on the web itself. These alternatives and options will be described below.

In any event, the sensing head 22 develops an A-C error signal which indicates direction and amount of web misalignment in accordance with the phase and amplitude, respectively, of the A-C signal. This signal is then processed through the pre-amplifier 24 and conducted to the output amplifier stage 26. The output amplifier is a push-pull circuit which develops its output voltage across a control winding of an A-C servo-motor which serves as the torque actuator 28. The servo-motor or torque actuator 28 is also supplied with a reference phase winding such that any variation between the reference phase voltage and the control or error phase voltage from output amplifier 26 will cause the servo-motor to rotate. As mentioned above, the direction and force of rotation will be in accordance with the phase difference and amplitude of the A-C control voltage relative to the reference phase voltage.

Rotation of the servo-motor shaft of torque actuator 28 is transmitted as longitudinal motion to operate a hydraulic valve 30 which controls web-repositioning or tracking by means of the web-positioning mechanism 32. The hydraulic valve 30 is a four-way, hydraulic valve, several types of which are known in the art, and the web-positioning mechanism 32 also comprises equipment which is known in the art. In particular, the hydraulic valve 30 and web-positioning mechanism 32 may comprise equipment similar to that disclosed in U.S. Patent No. 3,098,595, issued July 23, 1963, to J. J. Shelton, and entitled, "Dithering Servo Valve and Web Guide System."

It should be understood too that other types of web-positioning devices of the mechanical or electromechanical type may be controlled by means of a suitable linkage 33 connected directly from the torque actuator 28. Such positioning apparatus is known in the art and should be readily controllable by the apparatus of the disclosed system.

An illumination control 34 serves to sense lamp brightness and vary the average electrical power applied to the lamp so that constant brightness is maintained. This control is used with the transmitted-light sensing head, which comprises a second embodiment of the invention, and which embodiment will be later described.

FIG. 2 illustrates the electrical construction of the system which includes what is referred to herein as a main amplifier chassis 36.

Figure 3:
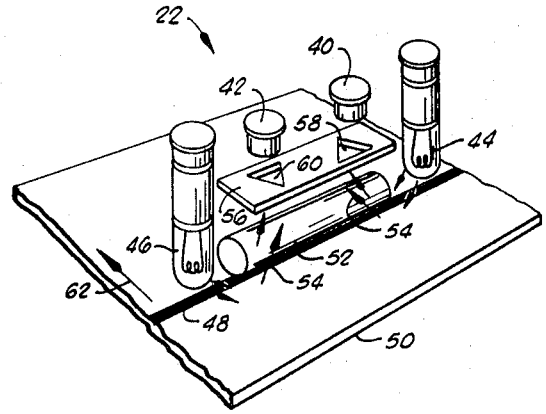
FIG. 3 is an exploded view of the operative elements of the reflected-light sensing head which is used in one embodiment of the system.

The sensing head 22, which in this first embodiment, is the "line-edge" or "reflected-light" sensing head, consists of two photoconductive elements 40 and 42 and two illuminating lamps 44 and 46. The functional relationship of these elements is shown in FIG. 3. This shows the elements of sensing head 22 aligned for "line" scanning of a guide line or indicator 48 which appears on a web 50.

The guide line may be any printed or other linear indicator which might appear on the moving material or web, as it is referred to in the art.

Figure 4:
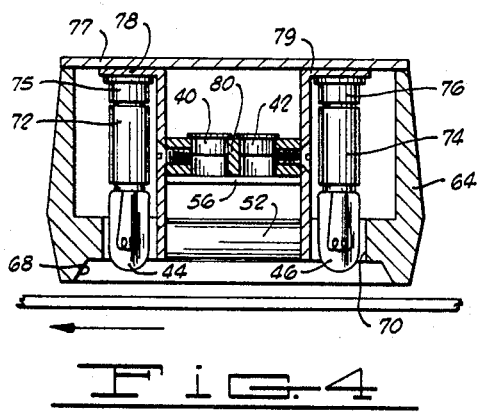
FIG. 4 is a sectional view of the reflected-light sensing head as seen normal to the direction of web movement.

In this "line" scan arrangement of FIG. 3, the photoconductors 40 and 42 are arranged along the guide line to receive illumination as reflected from lamps 44 and 46. Lamps 44 and 46 are situated along the guide line and on opposite sides of the photoconductors 40 and 42 so that they provide a flood of illumination in the area of the guide or web-indicator 48. A cylindrical lens 52 is positioned close to the moving guide line to transmit the reflected light, as shown by arrows 54, up to the photoconductors 40 and 42. Each of the photoconductors 40 and 42 is masked by a mask 56 with the inversely aligned triangular openings 58 and 60. The mask openings are arranged to accentuate and alternate the responses of the respective, matched photoconductors 40 and 42 with any lateral movement of the web. That is, when the web 50 moves in the direction of arrow 62, the reflected image of the indicator line 48 moves to the wide portion of mask opening 58, and, simultaneously, it falls in the narrow or apex portion of mask opening 60. Thus, the resistances of photoconductors 40 and 42 are unbalanced. When guide line 48 moves in the opposite direction, unbalance results in the opposite relationship as to the resistances of photoconductors 40 and 42. These resistance balance relationships are used to vary the output of an A-C resistance bridge and will be described shortly. First, however, references to FIGS. 4 and 5 will show the sensing head 22 in its physical layout.

A cast body member 64 having a suitable supporting attachment 66, or equivalent structure, is shaped to best control the ambient and reflected light which may be incident on the web 50 and guide line 48. The underside of casting 64 is provided with a recessed portion 68 and an oblong hole 70 for receiving the lamps 46 and 44 and lens 52 therethrough so that illumination is effected below the underside of the casting 64 with a minimum of ambient light interfering.

The lamps 44 and 46 are secured in lamp holders 72 and 74, respectively, which are supported on feet 75 and 76 and fastened to the cover plate 77. A pair of brackets 78 and 79 having a cross-member 80 are also supported from the cover plate 77. The cross-member 80 has two holes each disposed to receive and hold the photoconductor elements 40 and 42 in proper alignment with the mask 56 which is, in turn, suitably bonded or held below the cross-member 80. The lens 52 is also held between the lower ends of each bracket 78 and 79 such that a compact, unitary assembly results; i.e., the photoconductors 40 and 42, mask 56, lens 52, and lamps 72 and 74 are all rigidly supported from the cover plate 77 which can then be fastened by conventional practice to close the sensing head 22, thus properly positioning each of the elements for scanning in the recess 68 underneath the body member 64.

Figure 5:
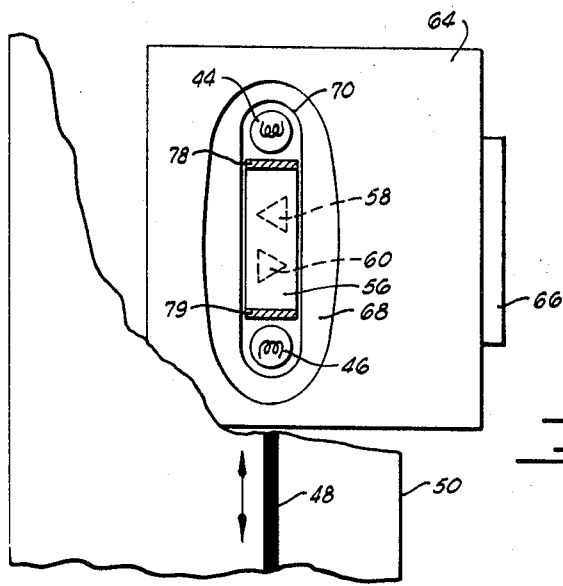
FIG. 5 is a bottom view of the reflected-light sensing head as seen through the web material.

FIG. 5 shows a bottom view of the reflected-light sensing head 22 as it would be seen up through the scanning area. The web portion 50 and guide line 48 illustrate the direction of web travel. This view shows to better advantage the placement of lamps 44 and 46, lens 52 and the mask openings 58 and 60 receiving reflected illumination up through the lens 52. It should be understood that the electrical connections to the elements within sensing head 22 may be made by any suitable circuitry. One manner would be by multi-conductor cable through the supporting structure into the interior of cast body member 64.

Referring again to FIG. 2, the photoconductors 40 and 42 and lamps 44 and 46, situated in the reflected-light sensing head 22, are connected by cable 86 through a suitable connector 87 to the main amplifier chassis 36 not specifically designated as such but including all of the electronic and the electrical switching parts of FIG. 2 interior of the various terminals. Thus, the resistance bridge components to be described are located in the main chassis and the bridges are completed through the connector 87 and cable 86 to the sensing head 22.

When the "line edge" or reflected-light sensing head 22 is set for "line" tracking, that is, when a switch 88 (located slightly to the right of connector 87 in FIG. 2) is set as shown, the resistance bridge includes both photoconductors 40 and 42 in adjacent legs of the bridge. An A-C supply voltage is applied to the bridge from a transformer 90. This is a step-down transformer receiving the line A-C through the primary via parallel leads 92 and main power leads 94, providing twenty-five (25) volts A-C across the secondary on leads 96 and 98. It will be understood that the various voltage and other values set forth herein are by way of example only and are not intended to be the only values which can be used. The A-C supply voltage is conducted through relay A (to be described later) in the setting as shown, so that one side of the supply is present on lead 100 and the other side, adjustable through "gain control" potentiometer 102, is present on lead 104. Both supply leads then conduct through a reversing switch 106, a "phase control switch," to points 108 and 110 which may be considered the A-C input points to the bridge.

Reference to FIG. 6 shows the "line" scan bridge configuration in standard schematic form with like components numbered the same as in FIG. 2. The twenty-five (25 v.) volts A-C applied at points 108 and 110 is paralleled through the two sides of the bridge. From point 108 a first current path goes through the "line-edge" switch 88 and photoconductor 42 to the output point 112. A second path goes through photoconductor 40 to output point 114. From the other A-C input point 110 current flows through a portion of potentiometer 116 and resistor 118 to output point 112, and, also, from point 110 through the remaining portion of potentiometer 116 to resistor 120 and then to the output point 114. The potentiometer 116 serves as the "balance control" for equalizing the bridge resistances during the initial setup of the equipment.

When it is desired to operate the reflected-light sensing head 22 for "edge" tracking, the switch 88 is thrown to its other (lower) position. The effective bridge circuitry in this position is the same with the exception that photoconductor 42 is switched out and a resistor 122 is inserted. This then allows rebalancing of the bridge by adjusting the dividing potentiometer 116, and a bridge circuit results which utilizes a single photoconductor for edge tracking of a moving web.

Some bridge resistance values which have been used to good advantage are as follows:

| | |
|---|---|
| Potentiometer 116 | kilohms 0–10 |
| Resistor 118 | ohms 500 |
| Resistor 120 | do 500 |
| Resistor 122 | kilohms 1.5 |

The above values have been employed in bridge circuits using one or two photoconductive elements of the type which is commercially available as Clarex 705L. It should be understood that various equivalents may be substituted while still yielding comparable results.

Returning to FIG. 2, the lamps 44 and 46 in sensing head 22 are connected in parallel between leads 124 of the cable 86. The lamp energization power of 6.3 volts A-C is delivered by lead 126 and the leads 128 and 130. The 6.3 volt A-C is obtained from transformer 132 which is connected serially in one side of the main power line 94. The main power circuit is completed through a full-wave rectifier 134 in the illumination control unit, shown in dash lines 34. In this, the first embodiment, the illumination control is not required with the reflected-light or with the "line edge" sensing head 22; however, it is used in the alternative transmitted-light or "edge" sensing head and it will be fully described later in connection therewith.

When either the "line" or "edge" bridge of sensing head 22 is being employed, when it is balanced, and when it is properly tracking, there will be no output across the output points 112 and 114. However, when a web tracking error occurs to change the light reflection pattern, the bridge will be unbalanced by a variation in photoconductor resistance and an A-C error voltage will appear across the output points 112 and 114. The phase and amplitude of the A-C error signal will be in accordance with the direction and amount, respectively, of the web mis-alignment. The error signal will always bear a relation of either 0° or 180° to the voltage on the reference winding of the servo-motor (to be described) depending upon the direction of web-alignment error. The error voltage is then conducted between leads 135 and 136 to the pre-amplifier 24. Lead 135 is the common side for all of the circuits and lead 136 conducts the A-C error voltage through a contact of relay A (of pertinence only in a later description) through an input capacitor 138 to the base of a transistor 142.

Transistor 142 is of type NPN and connected for A-C amplification. A power supply 144 provides regulated plus thirty (30 v.) volts, as will be described, between voltage supply leads 146 and 148 for energization of the pre-amplifier 24 stages. The base of transistor 142 is biased at a D-C value as set by a voltage divider consisting of resistors 150 and 152. The bias current through the emitter of transistor 142 is fixed by the resistor 154 and by-pass capacitor 156, and the input stage gain is adjustable by means of a potentiometer 158. The output is derived from the collector of transistor 142 and, upon a voltage development across a collector load resistor 160, the A-C output signal is conducted through a coupling capacitor 162.

The second stage, a transistor 164, is a similar configuration with base biasing through a voltage divider formed by resistances 166 and 168, and emitter biasing through a resistance 170. Thus, an A-C input to the base of transistor 164 develops an amplified A-C replica across a collector resistance 172 and the output is connected through a coupling capacitor 174 to the base of third pre-amplifier stage, a transistor 178.

Transistor 178, another type of NPN transistor develops base biasing through a resistor 180 which is connected to the regulated +B buss 146. A resistor 182 is connected to the emitter of transistor 178, and thus provides local current feedback to improve the A-C impedance relationship with the previous transistor 164 stage. The output is developed from the collector lead through the primary 184 of a transformer 186. The secondary 188 of the transformer 186 is connected to provide an alternately phased input to transistors 190 and 192 which are operated in common-collector push-pull as the driver stage 26. The energizing power for the push-pull stage, transistors 190 and 192, is obtained from a power supply 194 on leads 196 and 198 which provides unregulated +B voltage of fifty-six (56 v.) peak volts. The unregulated supply (to be described later) is desirable in the push-pull stage since overall efficiency of operation is increased and excessive ripple or voltage fluctuation can be compensated for by the push-pull phasing of transistors 190 and 192.

Thus, the input to driver stage 26 is developed across the secondary 188, tuned by capacitor 200 to the line frequency, and input voltage is applied simultaneously and in phase opposition to the bases of transistors 190 and 192. Transistors 190 and 192 are of the type-PNP and are connected in common-collector configuration with collector leads 202 and 204 directly attached to the negative buss 198 of the unregulated +B supply 194. The positive buss 196 of the unregulated supply is connected at a center tap 205 of the secondary 188 of transformer 186, and also at a center tap junction 207 between the control windings 206 and 208 of servo-motor 210. Hence, each of the emitters of transistors 190 and 192 is attached by respective leads 212 and 214 through a suitable connector or terminal 216 and cable 218 to the torque actuator assembly 28 where the emitter leads 212 and 214 then connect to the respective control phase windings 206 and 208 of servo-motor 210. Thus, the output from push-pull transistors 190 and 192 is developed across the split control windings 206 and 208 with simultaneous unregulated +B energization at center tap 207. A capacitor 215 is connected across the emitter leads 212 and 214 for the purpose of tuning the motor so that it has maximum stalled torque.

The servo-motor 210 is a two-phase A-C servo-motor of the type providing a split control phase winding. The reference phase voltage is supplied to reference winding 220 via leads 222 and 224 from the main power line input 94. A phasing capacitor 226 is connected in series with the reference winding 220 so that the reference current will be held in quadrature to the voltage across the control winding. One type of motor which has proven suitable in this application is the Model FPE 25L–107–13, two-phase, A-C motor manufactured by Diehl Manufacturing Company of Finderne, N.J.

The servo-motor 210, driven by energization of the control phase windings 206 and 208 and the reference phase winding 220, actually constitutes the torque actuator 28. The energization of servo-motor 210, which occurs with a detected error voltage from sensing head 22 and the subsequent amplification in pre-amplifier 24 and push-pull driver 26 (see FIG. 1), will cause the positioning of servo-motor 210 in accordance with the amount and direction of error. This rotational positioning of servo-motor 210 is translated into a longitudinal motion along the linkage 230 to control the hydraulic valve 30 (FIG. 1) which, in turn controls the web-positioning mechanism 32.

Figure 7:
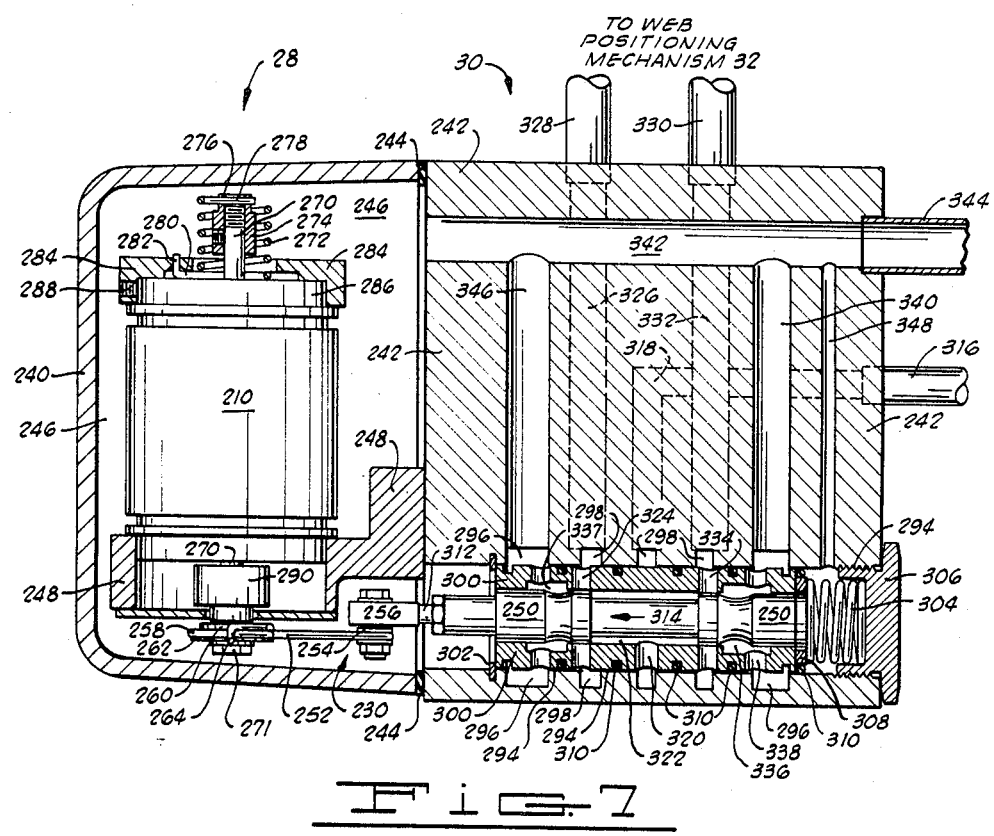
FIG. 7 is a longitudinal sectional view of the torque actuator and hydraulic valve.

With reference now to FIG. 7, there is shown the torque actuator 28 and hydraulic valve 30 in their operating situation. The composite units 28 and 30 will normally be located at a position near the web-positioning mechanism 32 and the cable 218 (FIG. 2) will provide a connection to the main amplifier chassis 36, which may be remotely positioned; for example, it may be located at a central control station in the area.

The torque actuator section 28 and the hydraulic valve 30 are mounted together. That is, the motor housing 240 is attached by suitable fasteners to the valve housing 242 and a sealing device, such as gasket 244, is provided so that an oil-tight, pressure resistant seal is afforded between the units. With this seal provided the system oil is allowed to be present continually in the cavity space 246, such that the servo-motor 210 and the remainder of the torque actuation mechanism is immersed in oil at all times. The servo-motor 210 is rigidly held and supported by conventional servo-motor clamps (not shown) on a frame 248 which is attached to the side wall of the valve housing 242 and thereby maintains the linkage 230 in correct alignment with the valve piston or spool member 250.

The linkage 230 consists of a connecting link 252, a heavy gauge of piano wire has been found suitable. The link 252 is movably attached by a suitable fastening member 254 to the rod end 256 for control of the valve spool 250. See also FIG. 8. The other end of the connecting link 252 is formed into a loop 258 which is spring fitted around the outer race of a ball bearing assembly 260. The bearing 260 carries an outer flange 262 for maintaining the wire loop 258 in the proper position around the periphery of bearing 260. The wire loop 258 is formed as a coil of one and one-quarter turns, and a small hook end 264 is formed so that it acts as a catch to hold the wire loop 258 on the bearing 260 periphery.

The inner race of bearing 260 is affixed on a hub 268 which is driven directly from motor shaft 270 and is fixed in eccentric relationship thereto. A suitable means, such as a screw 271, may serve to fasten the assembly in operative relationship. Thus, rotation of motor shaft 270 will impart, primarily, a side-to-side motion to the bearing 260 and wire link 252 such that longitudinal motion is apparent at the valve spool 250. In actual operation, the servo-motor shaft 270 is only moved through an arc of about one hundred and twenty (120) degrees (FIG. 8), which is sufficient to provide the necessary longitudinal cycle of movement such that spool 250 can completely control the hydraulic valve 30 through its full course of operation.

The upper end of servo-motor 210 includes a spring 272 for positioning of the shaft 270. Spring 272 provides a reactive force against which the motor torque acts so that the angular position of the motor shaft is proportioned to the motor torque. The shaft 270 carries a bushing 274 which has a slot or transverse hole 276 for receiving the inwardly bent upper end 278 of spring 272. The lower end of spring 272 is formed with an outward extension 280 which is bent up through a hole 282 in the locking cap 284. The locking cap 284 is formed to fit over the end plate 286 of servo-motor 210 and a set screw 288 is provided so that locking cap 284 may be rigidly affixed in a given position. Thus, upon initial setting up of the web guide equipment, the locking cap 284 can be rotated until proper alignment of the hydraulic valve is assured, and then the set screw 288 can be tightened down at the point which will be the zero or "null" position of servo-motor 210. The lower end of motor shaft 270 also is fitted with a damping bushing 290 which has a vane 292 (see FIG. 8) extended therefrom. Since the cavity 246 is continually filled with oil, any movement of vane 292 is resisted by the oil medium to provide viscous damping.

The hydraulic valve 30 consists of the valve body 242 having openings which function as the various inlet and outlet ports, as will be described, and the valve cavity opening defined by heavy black line 294. The valve cavity 294 is cylindrical and further includes the two outer radial chambers 296 and the three, narrower radial chambers 298 along its linear dimensions. A valve liner 300, generally tubular in shape and having various fluid control orifices, is held within the valve cavity 294 by a retaining ring 302 at one end and, at the other end, by a liner location spring 304 as it is positioned and held by a plug 306. A seal retainer 308 and a plurality of O-rings 310 serve to cut-off any fluid flow along the adjacent surfaces of valve cavity 294 and the valve liner 300.

The valve spool 250 is then inserted for longitudinal movement within the valve liner 300. Valve spool 250 is connected through its shank 312 and linkage 230 (piano wire 252) to the servo-motor 210 wherefrom it derives its longitudinal control movement. As mentioned before, it is only necessary to provide a very small longitudinal stroke of the valve spool 250 in order to enable the complete cycle of hydraulic control.

In the position as shown in FIG. 7, the valve is closed. With the valve spool withdrawn in the direction of arrow 314 the fluid flow is as follows: input flow line 316 provides fluid from a system pump (not shown) to duct 318 and the middle radial chamber 298 and then through the orifice 320 to the inner chamber 322. With the spool 250 moved in the direction of the arrow, fluid passage is from chamber 322 through orifice 324 to the left-hand radial chamber 298 and thence to a duct 326 and fluid line 328 to the web-positioning mechanism 32. Return flow from the positioning mechanism 32 enters through line 330 to duct 332 and then into the right-hand radial chamber 298. The fluid can then pass through orifice 334 into a chamber 336, and then out through orifice 338 to the right-hand radial chamber 296 which connects to the ductways 340, 342, and to the return line 344 which leads back to a hydraulic fluid reservoir (not shown) to complete the circuit.

In order to reverse fluid flow at control output lines 328 and 330, it is only necessary to move the valve spool in the opposite direction past the midpoint. That is, the reverse of arrow 314. Fluid flow is then reversed as between the output lines 328 and 330 and the return duct 346 assumes the function of duct 340. The return duct 342, leading to line 344 and the system fluid reservoir, also supplies circulating fluid in the motor cavity 246, as well as through a pressure equalizing duct 348 to the rear end of the valve liner and spool assembly (300 and 250). It should be understood that conventional tube connectors of various types may be employed for leading the fluid lines into the assorted ductways. Also, that a suitable oiltight electrical connector is employed for leading the energizing power into the unit to the servo-motor 210. Additional control valves for adjustment of fluid pressure are not shown, but may be employed as a matter of normal application. In particular, the input fluid line 316 may be controlled by a needle valve to regulate the applied fluid.

The web-positioning mechanism 32, controlled by the reversible fluid lines 328 and 330 (valve ducts 326 and 332, respectively), may be any of several types which are presently in wide use in the art. The previously cited patent to Shelton, No. 3,098,595, shows such mechanism in similar usage. Another patent to Powers, No. 3,024,955, issued Mar. 13, 1962, and entitled "System for Centering a Moving Web," discloses a similar mechanism.

Referring again to FIG. 2, the power supplies 144 and 194 each comprise a type which is essentially of conventional design. The unregulated, unfiltered supply 194 simply consists of a full-wave rectifier bridge 360 receiving thirty-six (36 v.) volts A-C on leads 362 from the secondary of main transformer 364 (a step-down type). Thus, an unregulated D-C supply voltage of about fifty-six peak volts is provided across the leads 196 and 198.

The power supply 144 provides a regulated thirty (30 v.) volts D-C supply voltage as required by the pre-amplifier 24 stages. The secondary of transformer 364 provides thirty-six (36 v.) volts A-C to the inputs of a full-wave rectifier bridge 366 and the rectified output is taken across leads 368 and 146. A filter capacitor 370 is connected across the D-C output in conventional manner at the input to a voltage regulation configuration. The voltage regulator comprises a series-type of regulator wherein the negative output lead 368 is connected to the collector of a type P-N-P transistor 372 which conducts as an emitter follower. The base of transistor 372 is connected to a Zener diode 374 which has a break-down voltage at about thirty (30 v.) volts D-C. A resistor 376 is tied from the negative lead 368 to the junction of the base of transistor 372 and Zener diode 374. The Zener diode 374 is biased into conduction at its characteristic Zener voltage to raise the voltage slightly at point 378 thus increasing the emitter-base conduction until equilibrium is established. The regulator maintains the D-C voltage constant between leads 146 and 148 which supply the D-C energizing voltage to transistors 142, 164, and 178.

The relays A, B and C of FIG. 2 provide a choice of operations which enable increased operator efficiency and faster, more exact setting-up or correcting of the equipment as will be more fully described in the operation section. The relay A when energized to its other position (opposite from that shown) places the equipment in "Manual" control. It should be stated here that in normal web-guiding operation the system tracks continually in response to the photoelectric bridge sensor 22 as previously described. This is the condition wherein none of relays A, B or C are energized and the equipment is said to be in "Automatic" control.

Energization of relay A places the equipment in "Manual" control wherein the sensing head 22 is removed from the amplifier input circuit and an alternate resistance bridge 379 is switched in. The pre-amplifier input lead 136 is then connected via lead 380 to a bridge output point 382. The opposite bridge output point 384 remains connected to the common lead 135. The A-C bridge input from transformer 90 and leads 96 and 98 is now connected as follows: lead 96 is switched to a resistor 386 and lead 388 to a bridge input point 390, and lead 98 is connected to a lead 392 and thence to a bridge input point 394. A resistor 391 of relatively small value is placed across the bridge input leads 388 and 392, in a voltage divider array. Thus, it can be seen that three legs of the bridge 379 consist of the resistors 393, 395 and 396. The fourth leg is inserted between bridge points 384 and 390 via respective leads 398 and 400 in response to actuation of either relay C, the "left" control, or relay B, the "right" control.

When relay C is energized, the bridge resistance traces from output point 384 to lead 398, lead 402, relay B contacts 404, lead 406 and then in parallel through resistors 408 and 410 via the relay C contacts 412 and 414 (closed oppositely from that shown), and finally through contact 416 of relay B to lead 400 to complete the bridge circuit at the bridge input point 390. It should be noted that the parallel path from contact 412 is via leads 417 and 418 back to the contact 414. The above conduction path results in a bridge circuit wherein resistances 395 and 396 are of equal value and the opposed resistance 393 has a value twice that of the inserted resistance; that is, the effective total of parallel resistors 408 and 410. Thus the bridge is greatly unbalanced in a manner and direction which, when the resultant A-C output signal is amplified and applied to the driver stage 26, will cause the torque actuator 28 to control the hydraulic valve 30 such that the web is moved to the left.

When relay B, the "right" control, is energized, the bridge resistance circuit is from output point 384 through a resistance 420, along lead 406, through series resistor 410, and then via lead 418 to the contact 416 of relay B (energized closed), and finally on lead 400 to the bridge input point 390. In this condition, the inserted resistance is one and a half (1½) times the resistor value of 393; resistors 395 and 396 still being equal and balanced, such that the output signal is of opposite phase from the previous example (relay C energized). The amplified, opposite-phase signal then controls the torque actuator 28, hydraulic valve 30 and web-positioning mechanism 32 to move the web to the right.

Some bridge resistance values which have been found to give the desired result are as follows:

| Resistor 393 | kilohms | 1 |
|---|---|---|
| Resistor 395 | do | 5.1 |
| Resistor 396 | do | 5.1 |
| Resistor 408 | do | 1 |
| Resistor 410 | do | 1 |
| Resistor 420 | ohms | 500 |

FIG. 9 shows a switch station 422 from which control of the system can be effected. Also indicated is a solenoid-lockout valve 424 which, when energized, serves to freeze the condition of the hydraulic valve 30 and, consequently, the web-positioning mechanism 32. The solenoid-lockout valve is located near the hydraulic valve 30 and can be energized to block the input and output hydraulic control lines. This can be a conventional type of arrangement and, therefore, it is not shown in its actual connection to the hydraulic valve 30. Thus, when the system is switched to manual by selector switch 426, the system is frozen and there is no web-guide control. However, depression of either the "right" switch 428 or the "left" switch 430 will energize the respective relays B or C to insert the proper bridge resistance which will then control the web to move right or left, and, simultaneously, each switch will de-energize the lockout solenoid 424 to enable the web-positioning.

A suitable cable may provide a connection from a terminal 434, located on the main amplifier chassis 36 (FIG. 2) to the switch station 422 which may then be placed at a position remote from the remainder of the system. The "on-off" switch 436 provides primary power to the system by connecting one side of the A-C line 438 to lead 440 and L1 of terminal 434, as well as to a lead 442 which supplies energizing power to the relay actuating switches 426, 428, and 430. Thus, when switch 426 is in the automatic position ("AUTO"), none of relays A, B or C are energized and the switch 426 maintains "open" between primary power lead 442 and the energizing lead 444 to the lockout solenoid valve 424. Hence, the lockout valve 424 is de-energized and exerts no stoppage over the hydraulic fluid circuit.

When switch 426 is placed in "manual," relay A is energized by power applied from lead 442, contact 446, and lead 448 to the terminal 434—No. 4 of the amplifier chassis 36. Simultaneously, primary power applied through contact 450, lead 452, contact 454, lead 456, and contact 458 is applied to energize the lockout valve 424 thus freezing the hydraulic circuit at the instantaneous alignment or lateral position of the web. In this "manual" position then, either of switches 428 or 430, "right" and "left" controls, may be depressed to energize respective relays B or C via the respective contacts 460 or 462. It will be apparent too that as either of switches 428 or 430 are depressed, the contacts 450 or 454 will be opened to momentarily de-energize the lockout-valve 424, thus enabling function of the hydraulic positioning system.

It is optional with the equipment, as dictated by its intended usage that, the same amplifier and relay chassis 36 (FIG. 2) may be used with a slightly different switch station 422 to provide (1) automatic operation and (2) at second mode responsive to servo-centering. This combination of operational modes is known as the "auto-servo" control. The resulting system provides the same automatic control, but a switch similar to switch 426 (FIG. 9) controlling relay A provides "servo" at the second position. When the system is switched to "servo" the web control apparatus is put under control of either (a) a servo-center tracking device (FIG. 10) or (b) a constant value resistance. This servo-center device is adjusted for center guiding with each web-guiding operation so that when the system is run in response to it, the web-positioning mechanism 32 (FIG. 2) tracks about a central position. The "right" and "left" pushbuttons 428 and 430 then act as override switches energizing the respective relays B or C to cause periodic jogging or web-shifting as controlled by the operator.

In FIG. 2, the cable 470 provides a servo-center attachment 471, an accessory attachment, consisting of a photoconductor 472 and a lamp 474. The arrangement is such that a shutter 473, movable by a suitable linkage 475 with the position of the web-positioning mechanism 32, is caused to vary light from lamp 474 to the photoconductor 472. FIG. 10 shows one form of such a device 471 where it is a separate assembly to be located for suitable actuation. In this form, a tapered rod 477 longitudinally movable with the web-positioning mechanism 32 is arranged to depress button 479, and thus the shutter 473, so that the incident light from the lamp 474 upon photoconductor 472 will be varied proportionately. The button 479 would be biased upward by a suitable spring loading mechanism.

Upon energization of relay A, the photoconductor 472 is placed in the alternate, A–C bridge circuit 379 (FIG. 2) consisting of resistors 393, 395 and 396. The initial centering procedure of the tapered rod 477 and the shutter 473 must adjust for a condition where the center position of web-positioning mechanism 32 causes the photoconductor 472 to balance the bridge circuit 379. Note that this is the same circuitry as for "manual" except that no solenoid-lockout valve is used and the servo-center attachment is connected via cable 470 at the terminal 476. The photoconductor 472 is led on one side to the common input lead 135 and the other side connects via lead 478 through the contacts 414 and 416 of de-energized relay B and C to the bridge input point 390. The energizing power for lamp 474 is applied from transformer 132 through lead 130, current limiting resistor 482 and lead 484 to the remotely located servo-center lamp 474. The return from lamp 474 is through lead 126 back to the transformer 132.

In some applications, it may be functionally desirable to provide merely a fixed resistance in place of the photoconductor 472 which is equal to the resistor 393 such that a balanced alternate bridge is provided. Then when relay A is energized to the "servo" position, no signal appears at the amplifier input lead 136 until one of the manual jogging relays B or C is energized to move the web right or left, respectively.

The various combinations of operational modes are optionally available for use of the equipment. The choice will depend upon the particular type of web-guiding operation; that is, the type of web and the type of function such as cutting, splicing, laminating, etc. We have specifically described the "auto-manual" and "auto-servo" operations. The "right" and "left" controls may or may not be included. Some simple operations will require only the "auto" operation while the more complex web control systems will best be performed with e.g., the "auto-servo" operation while the "right" and "left" controls can be momentarily depressed to override the primary mode, periodically jogging the web position.

Operation

In the normal or most used mode of operation, the automatic tracking system is performing and none of relays A, B or C is energized. The "line-edge" or reflected-light sensing head 22 is first aligned for "line" following as shown in FIG. 3 so that the track indication, line 48 in this example, is optically centered and equal illumination is sensed by the photoconductors 40 and 42. Simultaneously, the potentiometer 116 (FIGS. 2 and 6) is checked to assure a balanced bridge circuit. Also, the system gain control should be checked by adjustment of the potentiometer 102.

The sensing head 22, when properly aligned, will be disposed with the cylindrical lens 52 centered over the web indicator. In this manner, with the axis of the cylindrical lens parallel to the edge or line (whatever the indicator), the lens gives maximum acuity in the direction transverse to the indicator to provide maximum sensitivity to web variation. In the longitudinal direction along the web indicator, the cylindrical lens 52 will tend to smooth out any non-uniformity of the edge or line. The increased light gathering power of the cylindrical lens coupled with the ability to view a long segment of the edge or line without including extraneous lateral light enables the sensing head 22 to guide materials which produce very faint images, e.g., faint line indicators and transparent films.

As the web is traveling, any sidewise movement will cause the reflected image of line 48 to oppositely vary the resistance of photoconductors 40 and 42. The resistances will always vary in inverse relationship since the mask openings 48 and 60 are symmetrical but oppositely aligned to vary the respective resistances of photoconductors 40 and 42 inversely with the lateral movement of track line 48. Thus, it will be seen in FIG. 6 that the change in resistances of photoconductors 40 and 42 will cause unbalance of the A-C bridge circuit in one direction or the other, depending upon the direction of lateral movement of the web tracking line 48 (FIG. 3). The effect of this unbalance to a balanced A-C bridge circuit is to provide an output signal across the points 112 and 114 which will have an amplitude and phase indicative of the amount and direction, respectively, of the mis-alignment of the web.

When sensing head 22 is to be used in an "edge" following application, the head is aligned over the tracking point in similar manner and switch 88 (FIGS. 2 and 6) is placed in its other position. This replaces one photoconductor 42 with a resistor 122 of appropriate value, in the photoconductor mid-range, such that the A-C bridge can be balanced. Thus, with only one photoconductor 40 in the bridge circuit, the balance potentiometer 116 is adjusted so that balance is attained with about half of photoconductor 40 illuminated by web-edge reflection, that is; half of a portion normally illuminated through the mask opening 58 (FIG. 3). Then, any lateral movement of the web-edge 50 (not shown aligned) will vary the reflected light incident through mask opening 58 upon photoconductor 40 such that its resistance will be increased or decreased in accordance with the web-edge lateral deviation. By the same function as previously described, the balanced bridge circuit, which normally has no output, is caused to produce a voltage across points 112 and 114 which has amplitude and phase in accordance with the amount and direction of web mis-alignment.

Thus, use of either the "line" or "edge" sensing head 22 will provide a similar output at points 112 and 114 for application to the pre-amplifier 24. A switch 106 (FIG. 2) is provided for reversing the phase of input A-C voltage to the bridge at points 108 and 110. This may be necessary, according to the colors and reflection characteristics of the web and tracking indication, in order to provide the proper phase direction for correct opeation of the torque actuator 28.

Any error signal from the main resistance bridge (FIGS. 2 and 6) will then be applied between leads 135 and 136 (FIG. 2) to the pre-amplifier 24. The error signal will be an A-C voltage whose amplitude and phase indicates the amount and direction of web mis-alignment. The A-C error voltage is then amplified through the series of transistors 142, 164 and 178, whereupon the amplified A-C error output is developed across the primary 184 of transformer 186. The secondary 188, tuned to resonance by a capacitor 200, applied to A-C error signal in opposing relationship to the bases of transistors 190 and 192, operating in common-collector push-pull. Unregulated negative voltage from power supply 194 is applied on lead 198 to the collector leads 202 and 204. The unregulated positive voltage on lead 196 is applied to the center tap of transformer secondary 188 and the center tap connection 207 through the control windings 206 and 208 (of servo-motor 210) to the respective emitters of the push-pull transistors 190 and 192. Hence, the push-pull output error voltage is developed directly across the control windings 206 and 208 and the positioning of servo-motor 210 is controlled in response thereto.

Figure 8:
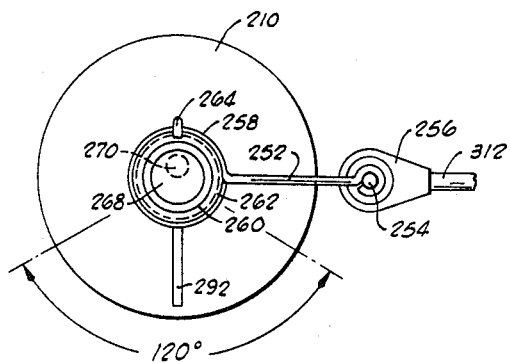
FIG. 8 is an end view of the torque actuator.

The torque actuator 28, comprised of the servo-motor 210 and the longitudinal drive linkage 230, controls actuation of the hydraulic valve 30. As shown in FIGS. 7 and 8, the servo-motor 210 has one end of its rotor shaft 270 held by a positioning spring 272. Movement of locking cap 284 and subsequent securement by the set screw 288 will allow the motor 210 to be zeroed such that the mean position, or position of no torque, can be adjusted so that the hydraulic valve 30 is maintained by its mid-position with no fluid flowing. Then, any error voltage from the push-pull output amplifier 26 will be of varied phase such that some torque will be developed by the motor and manifested at the motor shaft 270. The amount and direction of motor torque will be in accordance with the amplitude and direction of phase change of the push-pull error voltage developed in the motor control windings 206 and 208 (FIG. 2).

The motor torque then overcomes the rotational spring bias of spring 272 to move a small amount in one direction or the other, depending upon the direction of error. This motor rotation is then transformed via the off-center hub 268 (FIG. 8) and bearing 260 to cause a small longitudinal movement of the linkage member 252 and thus the hydraulic valve spool 250. A very small cycle of longitudinal movement of valve spool 250 is necessary to obtain full valve control. Hence, the total rotation of servo-motor shaft 270 need only be about one hundred and twenty (120) degrees; sixty (60) degrees either side of the motor zero point, as shown in FIG. 8.

FIG. 7 shows the hydraulic valve 30 with valve spool 250 at its mid-position. This is the position of no fluid flow such that the web-positioning mechanism 32 is held constant, at its particular position, with no influence exerted to obtain lateral movement of the web. When the valve spool is moved toward one extreme, e.g., toward the servo-motor 210 (left per this view) fluid is allowed to flow in one direction through the control lines 328 and 330. That is, input fluid from the system pump (not shown) at fluid line 316, can flow from the center radial chamber 298 through orifice 320 into the movable chamber 322, and then through orifice 324 to the left radial chamber 298 and duct 326, and, finally, to the control line 328 which leads to web-positioning mechanism 32. The return fluid line 330 from mechanism 32 finds a route through duct 332, right radial chamber 298, orifice 334, chamber 336, orifice 338, and duct 340 where it is T-connected to duct 342 and fluid line 344 to the hydraulic system reservoir (not shown).

In order to enable fluid flow in the opposite direction through web-position control lines 328 and 330, it is only necessary to slide the valve spool 250 past its mid-point in the opposite direction, i.e. toward the right or rear plug 306. Input fluid in duct 318 now flows to chamber 322 and then to the right radial duct 298 and duct 332 to fluid control line 330. Fluid return is from line 328 to duct 326, left radial chamber 298, chamber 337, radial chamber 298, and duct 346 which also leads back to the system reservoir.

The web-positioning mechanism 32, disclosed generally by reference herein, is effective to control the lateral position of the web in accordance with the amount and direction of fluid flow through the fluid control lines 328 and 330. It may also be preferable in some equipments to employ a direct drive linkage 33 (FIG. 1) to enable the torque actuator 28 to directly control other types of equivalent web-positioning mechanism 32, thus eliminating the intermediate hydraulic system altogether.

It is often desirable to provide additional operational modes with the web-guiding system in order to facilitate or render more versatile the entire web-control function. One such addition would be to supply the equipment with a switch station 422 as shown in FIG. 9 which allows "automatic" web-tracking or, alternatively, "manual" web-tracking with "left" and "right" control as exercised by the operator. In the "automatic" position of switch 426, the equipment operation is that which has just been described. When switch 426 is placed in "manual," relay A (FIG. 2) is energized through contacts 446 to place a different alternate A-C bridge 379 in the circuit and, in turn, contacts 458 energize a solenoid-lockout valve 424 so that the fluid condition of hydraulic valve 30 is frozen at whatever might be its present position. This results in no web-positioning control and the web runs without any guiding influence. However, with depression of the "right" switch 428, contacts 450 open the energizing circuit of lockout valve 424, thus freeing the hydraulic valve 30 for operation, and contacts 460 energize a relay B which places a reduced resistance, 408 and 410 in parallel, in the alternate bridge circuit 379 comprising resistances 393, 395 and 396. The bridge effect, with the reduced resistance (408 and 410) inserted, is to produce a maximum error signal which assures rapid movement of the web to the right. With release of "right" switch 428, the bridge circuit 379 is opened by release of relay B and the lockout valve 424 is re-actuated to freeze the hydraulic system. Hence, the web travels in its new position until varied by influences inherent in the web and/or web train.

When "left" switch 430 is depressed, contacts 462 energize relay C to insert an increased bridge resistance, and contacts 454 again serve to de-actuate the solenoid-lockout valve 424. With relay C energized the alternate bridge circuit 379 includes the same bridge resistors 393, 395 and 396, and the inserted resistance is the increased value of resistors 410 and 420 in series. This increased value is sufficient to cause a bridge output signal which controls the web-positioning mechanism 32 to drive rapidly to the left. Thus, in certain applications, it may be desirable for the operator to control continually and by sight in the manner as described above.

A further optional control system may be employed for a still more varied operation. Provision of an "auto-servo" control can be made with but only slight changes. This system would provide the normal "automatic" tracking as previously described, and the second switch position would enable either servo following of an indication derived from the web-positioning mechanism 32 or a constant resistance to prohibit any error signal. A switch station very similar to that of station 422 in FIG. 9 may be used with but little change, and in "auto-servo," no solenoid-lockout valve 424 is used. The exact switch control would be well within normal skill; hence, this operational description proceeds with reference to FIG. 2.

When relay A is energized, the equipment is said to be in the "servo" position. In addition, the servo-center sensing head 471 (photoconductor 472 and lamp 474) may be attached at connector 476 to the amplifier chassis 36. A lower powered lamp voltage is supplied to lamp 474. The photoconductor 472 forms a leg of the alternate A-C bridge circuit 379, resistors 393, 395 and 396. A shutter 473, mechanically actuated into the optical view between photoconductor 472 and lamp 474, is controlled by a suitable linkage 475 to be driven into and out of the optical view in accordance with the alignment of the web-positioning mechanism 32 (see FIG. 10). In one use, this has been by means of its lateral, tapered rod member (477 in FIG. 10) affixed to the web-positioner and which forces the shutter member into the optical view passage a distance proportional to the lateral movement of the rod. In any event, the response of photoconductor 472 is adjusted for a mid-point of resistance value which will properly complement the bridge resistance.

Thus, with the servo-center resistance (photoconductor 472 then providing the fourth leg of the alternate A-C bridge circuit 379), the web-positioning mechanism 32 will seek its center position and maintain the same since it is the mechanically controlled point of A-C bridge balance. The operator still has manual web control by means of energizing the relays B, "right" or C, "left" which now act as override jogging switches to move the web at will. These controls are particularly useful as an aid in the initial setting up and alignment of the system for a web-guiding operation.

In the event that a constant value of resistance is employed in place of the photoconductor 472, the operator can then enable the alternate bridge 379 by energization of relay A. This provides a balanced bridge having no output error voltage to pre-amplifier 24 and relays B or C can then be energized to effect right or left movement of the web.

It should be understood that the switch station of FIG. 9 is an exemplary showing of one form of equipment operation control, that which is termed the "auto-manual" control. Other similar schematic forms of switch station may be used to select the modes of operation in accordance with the requirements of operation and/or the extent of operation control. Thus, to select from the various modes the operator has only to energize the proper relays to select the desired action. This selection can be done with the use of ordinary industrial switches which can be located in any accessible place such as a central operators station or other remote place to fit the exigencies of the operational requirements.

*Detailed description of an alternative embodiment*

In this embodiment, the main amplifier chasses 36 (FIG. 2) is used in essentially the same manner as before, the difference being in the type of sensing head employed. The alternative sensing head 350 (see FIGS. 11 and 12) is termed a transmitted-light sensing head and is characterized by several features which differ from the reflected-light sensing head 22 as will be described.

In certain web-guiding applications, the transmitted-light sensing head 350 is preferable over the reflected-light head 22. For example, in tracking (a) an opaque or translucent edge, or (b) an opaque lamination on open mesh, etc., the transmitted-light sensing head 350 may actually be preferable. It has been found that the transmitted-light sensing head 350 frequently provides better accuracy and requires less attention in edge guiding installations than the reflected-light type of sensing head 22.

The system, modified in accordance with the second embodiment, would function in a similar manner as that previously set forth. The transmitted-light sensing head 350 with its connecting cable 490 (FIG. 11) would be substituted for the reflected-light sensing head 22 and its respective connecting cable 86. Referring to FIG. 1, the sensing head 350 is physically positioned to track a light-transmissive web indication by providing a variable photoelectric response. This response is used to vary the output across an A-C resistance bridge which, in turn, is applied to the input of pre-amplifier 24. The amplified A-C error signal is then applied to the push-pull driver 26 which positions torque actuator 28 so that its subsequent actuation of hydraulic valve 30 will properly control the web-positioning mechanism 32. The illumination control circuitry 34 also comes into play with the sensing head 350 as will be described below.

The sensing head 350, since it depends for operation upon transmitted light, is termed an "edge" sensor. Refer to FIGS. 11 and 12. It can be used to track a line or similar indication on a transparent web but its function of operation remains the same. That is, a portion of a web which will block transmitted-light is aligned and tracked within the optical view of the sensing head 350. The sensing head 350 (FIG. 12) is formed with a cast body member 492 which is U-shaped and provided with a suitable supporting rod or bar 494. The bar 494 can then be clamped at a desired position along the web train to thus operatively position the sensing head 350 in tracking relationship to the web 496. A lamp 498 is mounted in a recessed space 500 within body member 492 and is fitted with a suitable light collimating lens 502 and a cover glass 504. Directly in line, and on the other arm of body member 492, there is another recessed space 506 which is adapted to contain light responsive devices. The space 506 is also protected by a cover glass 508 and, at a distance within space 506 which would afford shielding of ambient light, a photoconductor 510 is mounted. An opaque light mask 512 is then mounted to overlay the photoconductor 510.

FIG. 13 shows the light mask 512 in its light-shielding position with respect to the photoconductor 510, the view looking along the cylindrical space 506 from the web 496 toward the photoconductor 510. The purpose of the mask 512 is to provide a linear response of the photoconducor electrical output indication as derived on leads 514 and 516 (see FIG. 11). The resistance of the unmasked photoconductor increases at what is nearly an exponential rate as the area of illumination is linearly decreased; hence, by varying the rate of area illumination as controlled by the mask 512 having a curved edge 518, the resistance response is linearized. The slope function of curved edge 518 is derived from a equation which represents a consideration of the particular cell response characteristic per the illuminated area. A rectangular area 520 of photoconductor 510 is left unmasked to provide a constant factor of resistance. Thus, the bridge circuit is assured a median resistance value at photoconductor 510 and variations due to lateral web movement are maintained within a desired range of resistance values.

The sensing head 350 is shown schematically in FIG. 11. The photoconductor 510 is connected via the cable 490 to the points #1 and #4 of connector 87 at the main amplifier chassis 36 (FIG. 2). A photovoltaic cell 522, to be further described, is connected through cable 490 to points #5 and #6 of connector 87, and the lamp 498 is similarly connected through points #7 and #8 of connector 87.

The A–C resistance bridge circuit is the same as was used in the first embodiment with sensing head 22. Referring now to FIG. 2, the "line edge" switch 88 is placed in the "edge" position and the photoconductor 510 is then in the bridge circuit between A–C input point 108 and the bridge output point 114. The A–C bridge consisting of photoconductor 510 and resistors 118, 120, and 122 can be balanced for proper operation by means of the potentiometer 116. An output indication or error signal from the bridge is then derived across output points 112 and 114 whereupon the signal is conducted via leads 135 and 136 to the pre-amplifier 24. Lead 136 conducts through the de-energized relay A to capacitor 138 which is the input to the base of transistor 142, the first pre-amplified stage. Lead 135 is the common lead to the pre-amplifier 24.

The phase-reversing switch 106 must be set at its proper position such that the direction of correction by the web-guide tends to eliminate the error in web-alignment as detected by the sensing head. The potentiometer 102 serves as the system gain control in the same manner as it does with the first embodiment using the reflected-light sensing head 22.

The lamp 498 provides illumination which is collimated and directed toward the photoconductor 510 as shown in FIG. 12. It has been found that this illumination will vary over a period of time, either by the inherent characteristics of the lamp bulb 498 or by the collection of dust and film on the cover glasses 504 and 508. In order to combat this condition and maintain a constant illumination on photoconductor 510, the photovoltaic cell 522 is employed to provide an indication to the illumination control circuit 34 (FIG. 2) such that the average power applied from the transformer 132 on leads 126, 130, and 128 to the lamp 498 is automatically varied. The photovoltaic cell 522 is positioned in the sensing head 350 in suitable mounting, such as in the space 506, whereby it can continually view the output illumination of the lamp 498 without interferring with the optical view to photoconductor 510 (see FIG. 12).

In FIG. 2, the illumination control 34 is essentially an A–C phase-controlled switch. The primary power, i.e., the line A–C voltage on leads 94 is applied to the full wave rectifier 134 with one side of the line conducting through the load or primary 526 of transformer 132. The proper lamp energizing voltage is induced in the secondary of transformer 132 whereupon it is conducted to the lamp 498 in sensing head 350. The average power drawn at the transformer 132 is varied by controlling the current duty cycle applied to the primary 526.

The full wave rectifier 134 provides a positive voltage on lead 528 and a negative voltage on lead 530. A Zener diode 532 is connected between the two D–C supply leads 529 and 530, and serves to regulate the voltage difference at a preset level. A type VR-20 Zener diode has been used in this application and it provides a voltage of about twenty (20 v.) volts up to the regulation or avalanche conduction point. A voltage dropping resistor 534 and an isolation resistance 536 are provided in series with the positive supply leads 528 and 529. The resistors 538 and 540 in series with potentiometer 542 are connected across the D–C supply leads 529 and 530 to serve as a voltage divider network. A center tapped lead 544 conducts an adjustable bias voltage to point #6 of connector 87 and so on to the solar cell 522.

The return lead 546 applies the biased solar cell 522 output to the base of an NPN-type transistor 548. The emitter of transistor 548 is connected to negative lead 530 and the collector is connected at junction 550 through a timing resistor 552 to the positive supply lead 529. Hence, a capacitor 554, connected between the junction 550 and the negative lead 530, is allowed to charge in accordance with the R–C time of the resistor 552 and capacitor 554 as varied by the collector current of transistor 548. Thus, it can be seen that when solar cell 522 generates a decreasing current the base current of transistor 548 is decreased which, in turn, accelerates the charging of capacitor 554 by allowing it to charge more rapidly through the timing resistor 552 to the D–C value of the positive supply lead 529.

The junction 550 is connected to the emitter 556 of a unijunction transistor 558 such that upon reaching its peak emitter voltage, as reflected from the charged voltage on capacitor 554, the unijunction transistor 558 will fire, conducting heavily through resistance 560, base one and base two of the unijunction transistor 558, and the resistor 562 to the power supply bridge 134. The lead 564 supplies gate current to the gate electrode of a silicon-controlled rectifier 566, also connected in parallel between D–C supply leads 528 and 530. Conduction of the unijunction transistor 558 thereby supplies sufficient gate current to fire the silicon-controlled rectifier (SCR) 566 which, in turn, permits rapid conduction through the SCR 566 between the D–C supply leads and thus "turns on" the A–C voltage source as it appears at the primary 526 of transformer 132.

The initial adjustment of the illumination control 34 requires the setting of potentiometer 542 so that the bias voltage on lead 544 will enable a particular range of base current to be present on on lead 546 as generated in solar cell 522. This particular base current should be such that capacitor 554 will charge sufficiently to trigger the unijunction transistor 558 which, in turn, gates the SCR 566 at a predetermined point along each half-cycle or A-C input voltage. In practice, it has performed well to set potentiometer 542 so that the SCR 566 fires near the peak of each half-cycle and conducts for the remainder of the half-cycle or until turned off when its anode current drops to a sufficiently low value.

With any change in illumination, the solar cell 522 will vary the base current to transistor 548 thus changing the charging rate of capacitor 554 so that the SCR 566 will be fired earlier or later in the A-C cycle. Thus, the average power drawn from the secondary of transformer 132 for energization of lamp 498 will be varied accordingly.

When using the transmitted-light sensing head 350 and illumination control 34, the remainder of the system is the same. The A-C error signal on leads 135 and 136 is of the same type and is processed in similar manner in the pre-amplifier 24 and driver stage 26. Thus, the torque actuator 28 is similarly controlled to continually position the hydraulic valve 30 so that it effects web alignment by means of the web-positioning mechanism 32.

With the relays A, B and C de-energized, the system tracks the web-edge in the "automatic" mode. "Manual," "left" and "right" controls can then be exercised in the same manner as described with respect to the first embodiment. Also, the servo-center attachment, connected at terminal 476 of the main amplifier chassis 36, may be utilized along with the remainder of the system to able "servo" control. Hence, it can be stated that the substitution of the transmitted-light sensing head 350 only affects the "automatic" mode of operation.

*Operation*

With switch 88 in the "edge" position the transmitted-light sensing head 350 is connected for operation at terminal 87. FIG. 11 shows the schematic illustration of sensing head 350 which is interchangeable with the sensing head 22 by attaching their respective connector cables 490 or 86 to the terminal 87 of the main amplifier chassis 36 (FIG. 2). The sensing head 350 is aligned physically so that the optical view between lamp 498 and photoconductor 510 is about half-way blocked by the web 496, which will be in approximate traveling alignment in its train. FIG. 13 shows the proper web alignment with respect to the optical view. It should also be stated here that the sensing head can be used in some cases for edge sensing of transparent webs. That is, for transparent web materials which exhibit inherent birefringence characteristics, e.g., cellophane, and various of the polymer films. This can be effected by interposition, in the collimated light beam and on opposite sides of the web-edge, of two, alternately polarized glasses which will then serve to alter the light which passes through the birefringent web so that an edge line image of light density gradation can be detected by the photoconductor 510.

Referring now to FIGS. 2 and 11, with sensing head 350 replacing sensing head 22, the photoconductor 510 is electrically included in the A-C resistance bridge between input point 108 and signal output point 114. Lamp 498 receives power from leads 126 and 128 through terminal 87, and the solar cell 522 is connected via the leads 544 and 546 to monitor the lamp 498 brightness and to control the illumination control circuit 34 in accordance therewith.

Photoconductor 510 comprises one leg of the bridge circuit consisting of resistors 118, 120 and 122. Upon initial set up, the potentiometer 116, the "BALANCE" control, is adjusted with the web properly aligned so that the A-C bridge will provide no output. Then during guiding operation, any lateral deviation of web 496, and hence its edge, will illuminate more or less of photoconductor 510 so that its resistance varies below and above the mid-point or balancing value. The balance deviations then cause an output A-C error signal at the output points 112 and 114 which has an amplitude and phase in accordance with the amount and direction, respectively, of web-edge deviation.

The output A-C error signal is then applied via leads 135 and 136 (relay A being de-energized) to the input of the pre-amplifier 24. The error signal is successively amplified in the transistor stages 142, 164, and 178, whereupon the output signal is developed in primary 184 of transformer 186. The secondary 188, a center-tapped coil, provides a tuned input to the output stage 26, consisting of transistors 190 and 192 operating in push-pull. The aforesaid amplifier portion and the remainder of the system operation is the same as was previously described. That is, the error signal is employed to position the torque actuator 28 which controls the hydraulic valve 30 and, in turn, the web-positioning mechanism 32.

The power supplies operate in the same manner and to the same ends with the exception that the illumination control 34 will be effective. In the event that the lamp 498 (FIG. 11) should change in illumination, the illumination control circuit 34 will react to vary the average lamp input power in correction. This change is usually apparent as a decrease in illumination as when dust or film may collect on the glass surfaces in the optical view, e.g., lens 502, cover glasses 504 and 508, etc.

With any reduction in brightness from source or lamp 498, the solar cell 522, in detecting relationship to the illumination, will decrease current flow from the collector of transistor 548 through junction 550 and resistor 552 to the D-C supply lead 529. Thus, allowing the capacitor 554 to charge more rapidly through the resistor 552 to attain the level of trigger voltage which is necessary to fire the unijunction transistor 558. The firing of unijunction transistor 558 at a prior time in the cycle results in conduction of the SCR 566 at the same prior time; and so, the power available at transformer 132 will have been increased by a small portion of the cycle. That is, the current duty cycle of each half-cycle of A-C line voltage, present across the primary 526, will be increased in proportion to the illumination decrease sensed by the photovoltaic cell 522. The lamp 498 will then receive increased average current on leads 126, 128, and 130 from transformer 132 to maintain its light intensity on the cell 522 at a preset level.

The "MANUAL," "LEFT-RIGHT," and "SERVO-CENTER" controls are still available in the second embodiment of the system. As shown in FIG. 2, the relays A, B and C, and the "servo-center" connector cable 470 will still function in their intended manner as previously described for the first embodiment.

The foregoing has disclosed a novel web-guiding system which extends the scope and application of a single equipment to various uses with diverse web materials and functions. The system of operation can be provided, as a matter of choice, with any of the several operational modes, depending upon the intended usage. In the main, automatic tracking is provided for use with surface indicator or edge indicator sensing, and the sensing may be performed with either reflected or transmitted-light, as dictated by the particular web material, pattern, indicator, etc.

Changes may be made in the combination and arrangement of elements as heretofore set forth in this specification and shown in the drawings; it being understood that, changes may be made in the embodiments disclosed without departing from the spirit and scope of of the invention as defined in the following claims:

What is claimed is:

1. A system for alignment and control of a traveling web comprising:
   a source of A-C reference voltage;
   web sensing means connected to receive said A-C reference voltage and providing an output voltage having an amplitude and phase indicative of the amount and direction, respectively, of a misalignment of said traveling web;
   amplifier means receiving said output voltage and providing an amplified A-C error voltage;
   driver means amplifying and providing the error voltage in push-pull output;
   two-phase servo-motor means receiving A-C reference voltage at the reference winding thereof and developing said push-pull output across the control winding thereof to effect rotational positioning of the motor;
   a four-way hydraulic valve means including a valve spool disposed within said valve means for longitudinal movement therein to effect fluid control;
   linkage means driven by said servo-motor rotation to effect longitudinal movement of said valve spool in accordance with said error voltage; and
   web-positioning means controlled in response to said four-way hydraulic valve to effect alignment of said traveling web.

2. Apparatus as set forth in claim 1 wherein said web sensing means comprises:
   a resistance bridge connected at two opposite points across said reference A-C voltage;
   two photoconductive elements connected to form each of two balancing legs of said bridge and positioned in optical viewing relationship to an indicator on said web;
   lamp means positioned to illuminate the indicator area of said web;
   masking means overlaying each of the photoconductors to oppositely vary their resistive responses to the movement of light reflected from the indicator and,
   means providing a bridge output from the two remaining opposite points of said resistance bridge.

3. Apparatus as set forth in claim 1 wherein said web sensing means comprises:
   a resistance bridge connected across said reference A-C voltage;
   a photoconductive element forming one leg of said bridge and being positioned adjacent the moving web; and
   lamp means positioned on the opposite side of said web in optical relationship to the photoconductive element such that the web edge lies within the light path from the lamp to the photoconductive element.

4. Apparatus as set forth in claim 3 which is further characterized to include:
   a photo-responsive cell disposed in optical relationship to said lamp means;
   an A-C voltage source for energizing said lamp; and
   reactance means connected to said A-C voltage source and controlled by said photo-responsive cell to vary the average power applied from the A-C source to energize the lamp means, whereby a decrease in luminosity will cause an increase in the average power applied to the lamp to maintain constant luminance.

5. Apparatus for maintaining alignment of a moving web as set forth in claim 1 wherein said web sensing means comprises:
   a resistance bridge which is energized by said reference A-C voltage;
   photoconductive means forming one leg of said bridge and being positioned next to the edge of said web with the photoconductive response area thereof parallel to the web; and
   illumination means disposed next to the edge of said web and on the opposite side of the web from the photoconductive means providing a beam of illumination directed at said photoconductive means which is partially intercepted by said web.

6. Apparatus as set forth in claim 5 which is further characterized to include:
   opaque mask means positioned over said photoconductive response area to maintain linear resistance change with a change in the illumination passing said web edge.

7. Apparatus as set forth in claim 1 wherein said web sensing means comprises:
   a resistance bridge connected across said reference A-C voltage;
   a pair of photoconductive elements forming two balanced legs of said bridge and each element being disposed in optical relationship to the web;
   a guide line indicator of constant width on said web which is aligned to pass through the optical view of the photoconductive elements;
   means for illuminating the guide line from opposite acute angles relative to the plane between the guide line and the photoconductive elements;
   opaque mask means overlaying the first photoconductive element having an opening which is shaped to vary the resistance responses with any lateral movement of the guide line; and
   opaque mask means overlaying the second photoconductive element which has similarly shaped opening of opposite orientation to inversely vary the resistance response of the second photoconductive element with the same lateral movement of the guideline.

8. Apparatus as set forth in claim 1 wherein said web has an alignment indicator thereon and wherein said web sensing means comprises:
   a U-shaped body member adapted to be operatively positioned around the edge of said web;
   a photoconductive element seated in one arm of said U-shaped member and being disposed in optical viewing relationship to the web and its associated alignment indicator;
   an illumination means seated in the opposite arm of said U-shaped member and providing a collimated beam of light through the area occupied by the web indicator and toward the photoconductive element; and
   a resistance bridge connected across said reference A-C voltage and including the photoconductive element as one leg thereof,
   whereby the bridge output voltage varies in amplitude and phase in accordance with the amount and direction, respectively, of web mis-alignment.

9. Apparatus as set forth in claim 1 wherein said web has an indicator area thereon and wherein said sensing means comprises:
   a generally rectangular body member adapted to be operatively positioned adjacent to the planar side of said web;
   lamp means disposed in each side of said body member and aligned in the direction of web travel to direct illumination toward the indicator area which lies centrally of the lamps;
   a cylindrical lens in said body member which is aligned in the direction of web travel and centrally situated over the indicator area;
   two photoconductive elements aligned adjacent one another in the direction of web travel and disposed to receive the image of said indicator area which is reflected through said lens;
   light masking means overlaying each photoconductive element so that a given indicator variation will cause opposite resistive responses in said photoconductive element; and
   a resistance bridge connected across said reference A-C voltage and including each of the photo conductive elements as two balanced legs thereof, whereby the bridge output voltage varies in amplitude and phase in accordance with the amount and direction, respectively, of web misalignment.

10. A system for alignment and control of a traveling web as set forth in claim 1 which is further characterized to include:
    an alternate resistance bridge connected to receive the A-C reference voltage and also supplying its output to said amplifier means;
    a first relay means which upon energization removes said web sensing means from the system and enables the alternate resistance bridge;
    a second relay means which upon subsequent energization inserts a resistance which unbalances said alternate bridge such that the bridge output voltage causes web-positioning in one direction;
    a third relay means which upon subsequent energization inserts a reistance which unbalances said alternate bridge oppositely such that the bridge output voltage causes web-positioning in the opposite directions; and
    means for selectively energizing said first, second and third relay means.

11. A system for alignment and control of a traveling web as set forth in claim 1 which is further characterized to include:
    an alternate resistance bridge connected to receive the A-C reference voltage and also supplying its output to said amplifier means;
    a servo control photo-responsive element forming one leg of said alternate resistance bridge;
    a servo control lamp means disposed to illuminate said photo-responsive element;
    a sliding shutter disposed to move within the illumination path from the servo control lamp and intercept varying amounts of said illumination, said shutter being connected for actuation by said web-positioning means so that a center position of said positioning mechanism allows illumination which causes a preset amount of resistance through said photo-responsive element to balance the alternate resistance bridge; and
    a first relay means which is remotely energizable and upon energization removes said web sensing means from the system and enables the alternate resistance bridge such that said web-positioning means will seek a position whereby the sliding shutter allows only the amount of illumination necessary to cause the resistance of the photo-responsive element to balance the alternate bridge and cease its output indication.

12. A system for alignment and control of a traveling web as set forth in claim 1 wherein said linkage means comprises:
   eccentric hub means being connected to receive drive rotation from said servo motor;
   bearing means connected around the circumference of said hub means; and
   connecting link means having a looped end which is mounted around said bearing means and having a shaft extension which is connected to said valve spool such that rotational movement of said servo motor imparts longitudinal motion to said valve spool member.

13. A system for alignment and control of a traveling web having an indicator thereon comprising:
   a source of A-C reference voltage;
   a photoconductive sensing means in optical viewing relationship to the web indicator;
   a resistance bridge connected at its input to said reference voltage source and including the photoconductive sensing means in said bridge;
   amplifier means for processing the output A-C voltage from said resistance bridge and for providing an amplified push-pull output;
   two-phase servo-motor means including reference and control windings and receiving phased A-C voltage at said reference winding and developing said push-pull output across said control winding;
   off-center hub means connected to be directly driven by said servo-motor;
   bearing means mounted around the circumference of said hub means;
   linkage means slidably supported on said bearing to be driven longitudinally in response to servo-motor rotation;
   four-way hydraulic valve means including an actuating spool which is driven by said linkage means; and
   web-positioning mechanism for effecting continual positioning of the traveling web in response to fluid as controlled by said hydraulic valve.

14. A system as set forth in claim 13 wherein said photoconductive sensing means comprises:
   two photoconductive elements physically disposed in optically viewing relationship to said web indicator and electrically connected in balancing relationship in said resistance bridge circuit; and
   two light masking means overlying said elements and being of similar triangular opening but of opposite lateral orientation relative to the web indicator, such that a given movement of the web indicator causes inverse resistive responses in the two photoconductive elements.

15. A system as set forth in claim 13 wherein said photoconductive sensing means comprises:
   a lamp means disposed on one side of the web and projecting a beam of collimated light past the web indicator;
   a photoconductive element disposed on the opposite side of the web to detect the cross-sectional area of light passing the web indicator, and said photoconductive element being electrically connected as one leg of said resistance bridge and having a midpoint of resistance which balances the bridge;
   masking means overlaying the photoconductive element for linearizing the characteristic of resistance variation with changing area of illumination; and
   illumination control means for sensing any variation in the luminosity of the lamp means and inversely varying the amount of average power to the lamp means to maintain the luminosity constant.

References Cited

UNITED STATES PATENTS

| | | | |
|---|---|---|---|
| 2,082,634 | 6/1937 | Johnstone | 250—219 |
| 2,220,736 | 11/1940 | Stockbarger et al. | 250—219 |
| 2,419,641 | 4/1947 | Hart | 250—237 X |
| 2,777,069 | 1/1957 | Saeman | 250—219 |
| 2,883,559 | 4/1959 | Bailey | 250—219 |
| 2,961,548 | 11/1960 | Prell | 250—219 |
| 3,132,253 | 5/1964 | Sorsen | 250—202 X |
| 3,232,547 | 2/1966 | Thiede et al. | 250—219 |

RALPH G. NILSON, *Primary Examiner.*

M. A. LEAVITT, *Assistant Examiner.*

U.S. Cl. X.R.

250—202